(12) United States Patent
Van Lieshout

(10) Patent No.: US 10,520,074 B2
(45) Date of Patent: Dec. 31, 2019

(54) SCISSOR GEAR ASSEMBLY

(71) Applicant: VCST Industrial Products BVBA, Sint-Truiden (BE)

(72) Inventor: Steven Van Lieshout, Geel (BE)

(73) Assignee: VCST Industrial Products BVBA, Sint-Truiden (BE)

( * ) Notice: Subject to any disclaimer, the term of this patent is extended or adjusted under 35 U.S.C. 154(b) by 0 days.

(21) Appl. No.: 15/745,767

(22) PCT Filed: Jul. 18, 2016

(86) PCT No.: PCT/EP2016/067100
§ 371 (c)(1),
(2) Date: Jan. 18, 2018

(87) PCT Pub. No.: WO2017/013082
PCT Pub. Date: Jan. 26, 2017

(65) Prior Publication Data
US 2018/0216716 A1 Aug. 2, 2018

(30) Foreign Application Priority Data

Jul. 18, 2015 (NL) ..................................... 2015189

(51) Int. Cl.
*F16H 55/18* (2006.01)
*F16H 57/12* (2006.01)

(52) U.S. Cl.
CPC ............. *F16H 55/18* (2013.01); *F16H 57/12* (2013.01); *F16H 2057/125* (2013.01)

(58) Field of Classification Search
CPC ...... F16H 55/18; F16H 57/12; F16H 2057/125
See application file for complete search history.

(56) References Cited

U.S. PATENT DOCUMENTS

| 4,947,707 | A | * | 8/1990 | Koenneker | ............. | F16H 55/18 |
|---|---|---|---|---|---|---|
| | | | | | | 464/68.1 |
| 5,870,928 | A | * | 2/1999 | Genter | .................... | F16H 55/18 |
| | | | | | | 74/409 |
| 6,109,129 | A | * | 8/2000 | Genter | .................... | F16H 55/18 |
| | | | | | | 74/397 |
| 2002/0121152 | A1 | * | 9/2002 | White | .................... | F16H 55/18 |
| | | | | | | 74/445 |

(Continued)

FOREIGN PATENT DOCUMENTS

| DE | 102011115692 A1 * | 4/2013 | ............. F16H 55/18 |
|---|---|---|---|
| WO | WO-2008142131 A2 * | 11/2008 | ............. F16H 55/18 |

*Primary Examiner* — Zakaria Elahmadi
(74) *Attorney, Agent, or Firm* — Patshegen IP LLC; Moshe Pinchas

(57) ABSTRACT

A scissor gear assembly 31 has a main gear 33 and auxiliary gear 35 concentric to the main gear and in axial direction near the main gear. Further the assembly has planar annular springs 37 being interrupted at one place. At the interruption the springs have two ends 37*a* and 37*b*. The springs are present between both gears and are with one end 37*a* connected to the main gear 33 and with the other end 37*b* to the auxiliary gear 35, so that both gears are connected to each other in rotation direction via the springs. The springs 37 are completely placed radial outwards of the rotation axis 34 of the main gear 33 so space is created to assemble multiple springs. The solution is special suited for relative large size scissor gears.

6 Claims, 2 Drawing Sheets

(56) References Cited

U.S. PATENT DOCUMENTS

| | | | |
|---|---|---|---|
| 2002/0128098 A1* | 9/2002 | Mott | F16H 55/30 474/94 |
| 2009/0114045 A1* | 5/2009 | Wilson | B60K 17/28 74/11 |
| 2010/0139431 A1* | 6/2010 | Park | F16H 55/18 74/409 |
| 2013/0145878 A1* | 6/2013 | Kim | C22C 33/0264 74/445 |
| 2013/0213168 A1* | 8/2013 | Buchleitner | F16H 55/18 74/445 |
| 2014/0116174 A1* | 5/2014 | Sandner | F16H 55/18 74/440 |
| 2014/0360300 A1* | 12/2014 | Viechtbauer | F16H 55/18 74/445 |
| 2016/0053881 A1* | 2/2016 | Zeller | F16H 55/18 74/440 |

* cited by examiner

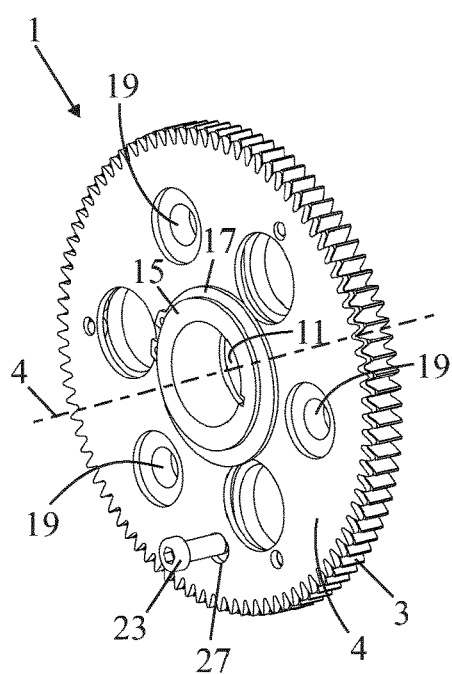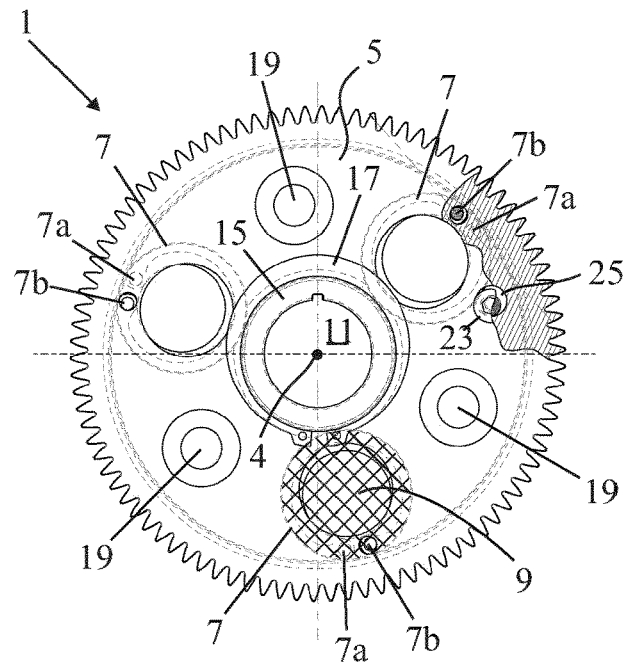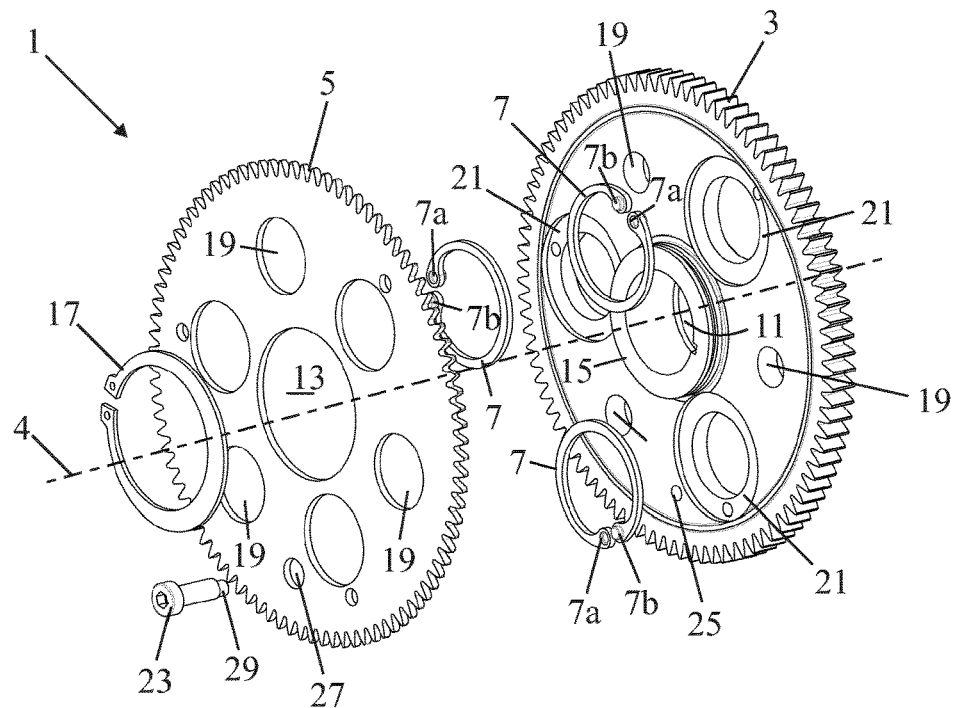
FIG. 1
FIG. 3
FIG. 2

SCISSOR GEAR ASSEMBLY

TECHNICAL FILED OF THE INVENTION

The invention relates to a scissor gear assembly comprising:
- a main gear having a rotation axis;
- an auxiliary gear concentric to the main gear and in axial direction near the main gear, which auxiliary gear comprises a toothed ring, the teeth of which are at the outside, which ring having an inner surface; and
- at least three annular springs integrally formed with the auxiliary gear and being inside the toothed ring, each of the springs is interrupted at one place at which place the springs have two ends close to each other, one of the ends is fixed to the toothed ring of the auxiliary gear and the other free end is connected to the main gear which springs are present between both gears and are connected to the main gear with one end and are connected to the auxiliary gear with the other end, so that both gears are connected to each other in a rotational direction, each spring substantially encloses a surface and each spring seen in axial direction is arranged within the circumference of the main gear;
- wherein, viewed in axial direction the rotation axis of the main gear is present outside the surfaces within the planar annular springs.

A scissor gear assembly is well known in the industry and often used in combustion engines for driving cam shafts, balancer shafts, fuel injection pumps or air compressors to prevent rattling noise because of load reversals and/or crank torsional vibrations. The scissor gear comprises a main and an auxiliary gear rotatable on a mutual axis and in rotation direction connected by a resilient member. The resilient member can be a spring with an annular shape.

BACKGROUND OF THE INVENTION

A scissor gear according to the preamble of claim 1 is known from DE102011115692A1. The spring is selected in such a way that the negative torque due to load reversals and crank vibrations are eliminated. The known scissor gear assembly has contact with both the driving flank and coast flank of its mating gear and because of this rattling is prevented. Especially, the rattling noise at low rpm for instance at idling is noticeable and not wanted. The advantage of a flat annular spring compared with a coiled wire compression or coiled wire tension spring is the compact size in axial direction of the scissor gear assembly. This way the body of the scissor gear assembly can be kept thin so it does not need much engine space. The spring load generated by opening or closing the annular spring can be easily transferred from the main gear to the auxiliary gear without creating significant tilting. This because the forces are in planes with relative small offset.

Because of a small interruption in the annular spring forming two spring ends that are close to each other, the spring ends can be positioned in the assembly such way that the spring forces are almost perfectly tangential to the rotation direction of the gear and the spring forces will deliver optimal spring torque. With a small interruption, the spring forces will give no or relative small bending torque in the fixation of the main gear and the fixation of the auxiliary gear. This way the spring fixation can be designed relatively small and the spring section can be designed small towards the ends to have maximum spring stroke.

Using a spring acting in tangential (rotational) direction as an annular spring wherein the spring ends are designed close to each other, no transformation of spring force to tangential direction is required. This in disregard with many scissor gear solutions that make use of an axial or radial acting spring. In the latter two cases the radial or the axial spring force(s), need(s) to be transferred to a tangential (rotational) force to create a torque between the main gear and the auxiliary gear. Such transformation mechanism will cause friction, resulting in efficiency losses and wear.

For small gears and high volume gear projects as usual for automotive engines, the annular spring can be easily produced with fine blanking out of soft material. After the blanking process the annular spring needs to be hardened and tempered to a martensitic microstructure to get the desired spring properties. An alternative heat treatment is austempering to a bainitic microstructure. The latter gives in general smaller heat distortion.

However, for larger annular springs for instance used in truck engines the production volume is relative small. The fine blank tool invest for a big annular spring is becoming relative high. Further the tool gets technically more complex when the size is larger. The distortion of the spring because of the heat treatment will become inacceptable. The tolerance of the distance between the spring ends will give too much tolerance in spring force and the tolerance of the flatness will give assembly problems. This can be solved with high invest and expensive solutions like press hardening and grinding and or machining after the hardening but this will weight on piece price costs and investments.

It has been found that a large annular spring stamped from a relative thin plate (2 to 4 mm) is relative more slender than a small spring made from the same sheet thickness. At a certain moment it is becoming instable because of lateral-torsional buckling. Further, it has been found that at a certain moment the eigenfrequencies are becoming too low and in the range of the engine vibrating frequencies which lead to spring resonance, early breakage of the spring and/or unwanted rattling noise. It has been found that when the spring is placed around the axis of rotation, the rotational speed and torsional vibrations of the shaft where the scissor gear is mounted on, have relative large impact on the resulting spring force. This effect can be positive or negative depending from the application.

Another disadvantage of a single annular spring gear is that the spring will generate a spring force not in line with the gear axis. The main gear and the auxiliary gear rotatable positioned on a mutual axis need a minimum radial play. This to absorb geometrical and dimensional tolerances and to guarantee a minimum oil film. Because of the spring force of the annular spring, the radial play between both gears will be forced to one direction. During rotation of the scissor gear assembly in mesh with another gear, the spring force will continuously change in direction relative to the tooth force of the auxiliary gear in mesh with the other gear. In a certain position during rotation of the scissor gear assembly in mesh with another gear, when the spring force is perpendicular or in the same direction as the radial tooth force, the auxiliary gear will be forced away from the gear in mesh. In another rotation position the spring force will be pointing in a direction opposite to the radial tooth force and will move the auxiliary gear in the direction of the gear in mesh. This continuously changing distance of the auxiliary gear relative to the gear in mesh will give a tooth to tooth transmission error. A higher transmission error generally increases the level of high frequent whine noise (other than low frequent rattling noise).

Further, the annular spring with only one interruption makes it often impossible to provide the main gear with holes for multiple bolts for axial clamping or mounting the gear to an axle or flange. This way applications of such a scissor gear are limited to situations where the fixation to an axle or a flange is with a central bolt or to situations without bolts.

Further, the auxiliary gear should be fixed in axial direction to the main gear in such a way that the fixation is effective, non-expensive and requires no or a little space.

SUMMARY OF THE INVENTION

It is an object of the invention to provide a scissor gear assembly that does not have the disadvantages of the known gear assembly described above. More particularly, the object is to provide a scissor gear assembly having an improved axial fixation of the auxiliary gear to the main gear. To this end the scissor gear assembly according to the invention is characterized in that both of the ends of the springs in axial direction hook behind a hook attached to the main gear. Preferably, the main gear has a central hole and viewed in axial direction this central hole and the surface within the planar annular spring do not overlap each other.

A preferred embodiment of the scissor gear assembly according to the invention is characterized in that the main gear has a circular collar which is in contact with the inner surface of the toothed ring and is interrupted at locations where the springs extend inside the toothed ring, wherein the hooks are part of the side walls of the collar bounding the interruptions. In this way the connection between the gears needs less space. It is noticed that the advantageous feature of a main gear having a collar can also be used in a scissor gear assembly having an other axial fixation known by somebody skilled in the art than the one described above for instance a retaining clip or a rotational bayonet lock.

A further preferred embodiment of the scissor gear assembly according to the invention is characterized in that the springs each have a shape of a half circle, at the ends of the circle there are arms extending in radial direction towards the middle of the circle. Such a spring has an optimal characteristic for the purpose it is designed for. Also, with respect to this advantageous feature of the springs having a shape of a half circle it is noticed that this feature can also be used in a scissor gear assembly having an other axial fixation known by somebody skilled in the art than the one described above.

The scissor gear assembly according to the invention can be narrow and does not require a large springs that needs high investment for tooling to prevent distortion during heat treatment or that needs post machining due to distortion after heat treatment. The springs of the assembly according to the invention should not be too slender that it will become instable because of lateral-torsional buckling or that the eigenfrequencies are becoming too low in the range of engine vibrations.

Because the rotation axis is completely outside the circumference of the springs, space is present for multiple annular springs and/or holes for bolds. The springs have relative small sections. The further the spring ends are placed from the rotational axis of the scissor gear assembly the bigger the torque will be generated by the spring(s).

The main gear and the auxiliary gear rotatable positioned on a mutual axis need a minimum radial play. This to absorb geometrical and dimensional tolerances and to guarantee a minimum oil film. The springs can be placed uniformly distributed over the gear around the mutual axis so the spring forces of the multiple springs are eliminating each other. Upon rotation of the scissor gear assembly in mesh with another gear, the auxiliary gear will always be forced away from the gear in mesh because of the radial tooth force independent from the rotational position of the scissor gear assembly. This way the radial play will not affect the distance between the auxiliary gear and the gear in mesh during rotation. So, the multiple annular spring solution will not give a tooth to tooth transmission error nor will this solution give reasons for additional high frequency noise. The individual springs are relative small and relative stiff in axial direction. The eigenfrequencies of such small spring is much higher than a single large annular spring and can be kept above critical engine vibration frequencies. Holes for fixing the scissor gear assembly to an axle or flange can be provided. The bolds can be positioned through the central area of the annular spring or in the space formed between the uniformly distributed springs.

The relative small springs can be easily produced for instance with fine blanking without high tool invest. Because of the relative small size, distortion because of heat treatment is limited so the parts do not need post-machining or do not need expensive tooling and equipment for press hardening.

The relative small springs can be made from relative thick sheet (2 to 4 mm), so the annular spring will be relative stable and not sensitive for lateral torsional buckling. The eigenfrequencies will be relative high and can be kept above the engine vibrations frequencies so resonance of the spring can be prevented. The rotational speed and the torsional vibration of the shaft where the scissor gear assembly is mounted on will have less effect on the resulting spring force. Because the spring is completely placed radial outward the rotation axis, the centrifugal forces will force the complete spring outwards instead of opening the spring ends. So spring force is less dependent from rotational speed.

The spring ends have connection means for connecting the spring to the main gear and the auxiliary gear. The connection means can be a pin, a hook or an abutting surface transferring the spring force from the main gear to the auxiliary gear. Additional connection means can be provided to make assembly or transportation prior to mounting the scissor gear assembly in the gear train easier. With the additional connection means both ends of the spring can be connected either to the main gear or to the auxiliary gear so the spring(s) are partial pre-loaded. This way the scissor gear assembly can be easily assembled and transported before it is placed in a gear train meshing with a counter gear.

An optional grenade pin can be used to fix the relative gear position while aligning the gear teeth of the main gear with the auxiliary gear. This way the tooth gap needs not to be forced open during assembly of the scissor gear into the gear train.

The grenade pin can have an eccentric protrusion, so by rotation of the pin the auxiliary gear rotational position relative to the main gear can be fine adjusted. This way the tooth from main gear and auxiliary gear can be perfectly aligned. While aligning the gear tooth of both gears one end of the spring will lose contact with the main gear. The spring force will be transferred through the pin back to the main gear. This way the gear can be easily assembled in the gear train. By rotating the eccentric pin the tooth gap between main and auxiliary gear will reduce and at a certain moment the spring load in connection with the auxiliary gear will be transferred from the auxiliary gear to the counter gear in contact with the coast flank of the counter gear. The drive flank of the counter gear tooth in mesh will also come in contact with the main gear and transfer the spring load from the counter gear to the main gear back to the other end of the spring. At this point the load transfer via the pin will disappear and the pin can be easily pull out of the main gear. The eccentric grenade pin can be also a tool only used at the gear train assembly line to temporally align the gear teeth of main gear and auxiliary gear during mounting of the scissor gear assembly.

The angle over which the interruption in the annular spring and/or further spring extends is preferably less than 90°.

BRIEF DESCRIPTION OF THE DRAWINGS

The invention will be further elucidated below on the basis of drawings. These drawings show an embodiment of the scissor gear assembly according to the present invention. In the drawings:

FIG. 1 shows an example of a scissor gear assembly in perspective view;

FIG. 2 shows the scissor gear assembly in exploded view; and

FIG. 3 shows the scissor gear assembly in front view.

DETAILED DESCRIPTION OF THE DRAWINGS

Figure 4:
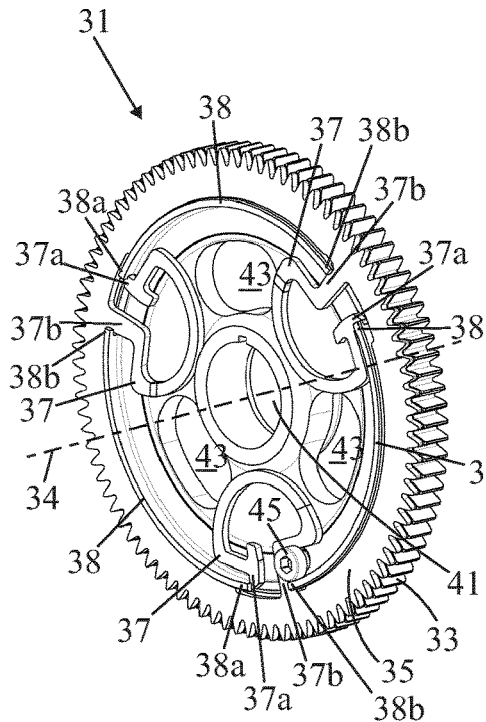
FIG. 4 shows an embodiment of the scissor gear assembly according to the invention in perspective view.

In FIGS. 1 to 3 an example of a scissor gear assembly is shown in a perspective view, an exploded view and in a front view respectively. The scissor gear assembly 1 has a main gear 3 and auxiliary gear 5 concentric to the main gear and in axial direction near the main gear. Further, the assembly has multiple planar annular springs 7 being interrupted at one place. At the interruption the springs have two ends 7a and 7b. The springs are present between both gears and are arranged within the circumference of the main gear. The springs are with one end 7a connected to the main gear 3 and with the other end 7b to the auxiliary gear 5, so that both gears are connected to each other in rotation direction via the springs. These connections are realized by pins on the ends 7a, 7b of the springs and corresponding holes in the gears 3, 5 in which the pins protrude.

The main gear 3 and the auxiliary gear 5 both have a central opening 11, 13. Further, the main gear is provided with a collar 15 around the opening 11, which collar protrudes through the opening 13 in the auxiliary gear. The diameter of the opening 13 is slightly larger than that of the collar, so that the auxiliary gear 5, can rotate around the collar 15. The auxiliary gear 5 is fixed in axial direction on the collar 15 by a retaining ring 17 which is locked in a circumferential groove present in the collar.

Each spring 7 substantially encloses a surface 9. Viewed in axial direction the rotation axis 4 of the main gear is present outside these surfaces 9 within the planar annular springs 7. Because the rotation axis is completely outside the circumference of the spring, space is provided for multiple annular springs and holes 19 for bolds. Further, viewed in axial direction the central hole 11 in the main gear 3 and the surfaces 9 within the planar annular springs do not overlap each other.

Cylindrical cavities 21 are provided in the main gear to incorporate the annular springs. The diameter of these cavities are slightly smaller than the outer diameter of the annular springs 7 in relaxed condition. The springs are assembled in sprung load condition with a stroke that is just a little bit smaller than the stroke in operating condition when the gear assembly 1 is in mesh with its counter gear.

A grenade pin 23 is present in a hole 25 in the main gear 3 and protrudes through a hole 27 in the auxiliary gear 5 to fix the relative position of both gears. The grenade pin has an eccentric protrusion 29 present in the hole 25, so that by turning the pin 23 the relative angular position of the auxiliary gear and the main gear can be adjusted. Such a grenade pin can also be used in the assembly shown in FIGS. 4-6.

If the annular springs will be produced separately the springs can be axial positioned between the main gear body and the auxiliary gear body. A cavity can be provided in one of the gear bodies to incorporate the annular spring. The cavity can be made cylindrical so it is easy to machine.

The cavity diameter can be made a little bit smaller than the outer diameter of the annular spring in relaxed condition. The spring(s) can be assembled in sprung load condition with a stroke that is just a little bit smaller than the stroke in operating condition when the gear is in mesh with its counter gear. This is one option forming the additional connection means of the spring end.

Another option is to provide the springs with an auxiliary pin and to provide the main gear with auxiliary corresponding holes in the main gear. The auxiliary pins need to be sufficient smaller than the corresponding holes so the auxiliary pins can freely move when the scissor gear gets in mesh with its counter gear. Preferably the auxiliary pins are integrally formed with the spring during the fine blanking process.

Figure 6:
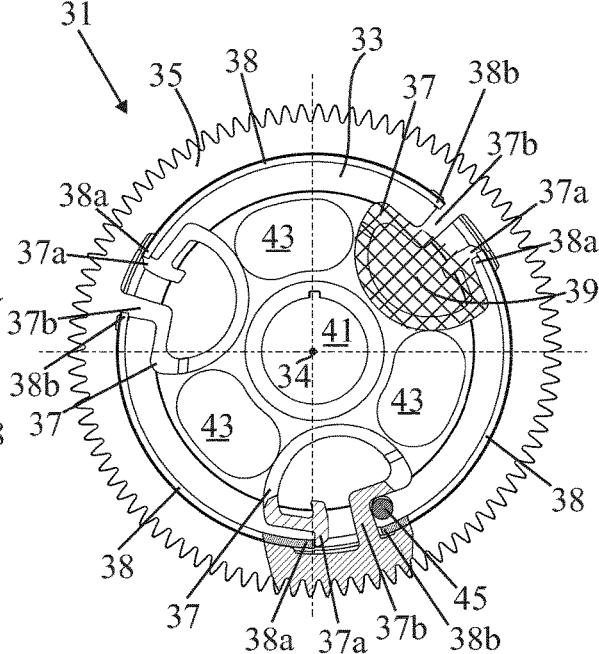
FIG. 6 shows the scissor gear assembly of FIG. 4 in front view.
Figure 5:
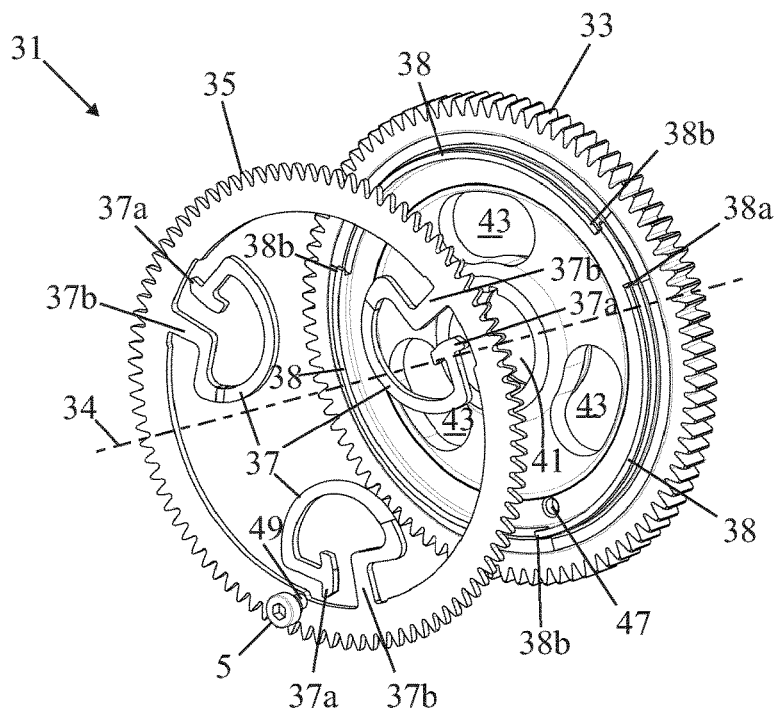
FIG. 5 shows the scissor gear assembly of FIG. 4 in exploded view.

In FIGS. 4 to 6 an embodiment of the scissor gear assembly is shown in a perspective view, an exploded view and in a front view respectively. The scissor gear assembly 31 has a main gear 33 and auxiliary gear 35 concentric to the main gear and in axial direction near the main gear. The assembly has multiple planar annular springs 37 being interrupted at one place.

The main gear 33 has a circular collar 38 which is in contact with the inner surface of the toothed ring. The collar is interrupted at locations where the springs extend inside the toothed ring. The hooks 38a, 28b are part of the side walls of the collar 38 bounding the interruptions.

The springs 37 each have a shape of a half circle. At the ends of the half circle there are arms extending in radial direction towards the middle of the circle. The angle over which the interruptions in the annular springs extend is less than 90°. At the interruption the springs have two ends 37a and 37b. These springs 37 are integrally formed with the auxiliary gear 35 and are with one end 37b fixed to the auxiliary gear 35 and the other free ends 37a are in contact with ends 38a of further collars 38 on the main gear 33. These ends 38a constitute hooks behind which the ends 37a of the spring 37 are caught in axial direction. The other ends 38b of the collars 38 constitute further hooks behind which the other ends 37b are caught in axial direction.

The main gear 33 has a central opening 41 and each spring 37 substantially encloses a surface 39. Viewed in axial direction the rotation axis 34 of the main gear is present outside these surfaces 39. Because the rotation axis is completely outside the circumference of the spring, space is provided for multiple annular springs and holes 43. Further, also in this assembly, viewed in axial direction the central hole 41 in the main gear 33 and the surfaces 39 within the planar annular springs do not overlap each other.

A grenade pin 45 is present in a hole 47 in the main gear 33 and protrudes through the auxiliary gear 35 wherein it contacts a side wall of the end 37b of one of the spring 37 to fix the relative position of both gears. Also this grenade pin has an eccentric protrusion 49 present in the hole 47, so that by turning the pin 45 the relative angular position of the auxiliary gear and the main gear can be adjusted.

Although the invention has been described in the foregoing based on the drawings, it should be observed that the invention is not by any manner or means restricted to the embodiment shown in the drawings. The invention also extends to all embodiments deviating from the embodiment shown in the drawings within the scope defined by the claims.

The invention claimed is:

1. Scissor gear assembly comprising:
   a main gear having a rotation axis;
   an auxiliary gear concentric to the main gear and in axial direction of the rotation axis near the main gear, which auxiliary gear comprises a toothed ring, the teeth of which are at the outside, which ring having an inner surface; and
   at least three annular springs being present between both gears and being integrally formed with the auxiliary gear and being inside the toothed ring, each of the springs is interrupted at one place at which place the springs have two ends close to each other, one of the ends is fixed to the toothed ring of the auxiliary gear and the other end is connected to the main gear, so that both gears are connected to each other in a rotational direction, each spring substantially encloses a surface and each spring seen in axial direction is arranged within the circumference of the main gear;
   a circular collar attached to the main gear and being in contact with the inner surface of the toothed ring and being interrupted at locations where the springs extend inside the toothed ring;
   hooks attached to the circular collar and extending in tangential direction from the side walls of the collar bounding the interruptions, said side walls being in contact with ends of the springs at the interruptions,
   wherein, viewed in axial direction the rotation axis of the main gear is present outside the surfaces within the planar annular springs, and
   wherein both of the ends of the springs in axial direction hook behind said hooks.

2. Scissor gear assembly according to claim 1, characterized in that the springs each have a shape of a half circle, at the ends of the half circle there are arms extending in radial direction towards each other.

3. Scissor gear assembly according to claim 1, characterized in that the main gear has a central hole and viewed in axial direction this central hole and surfaces within the planar annular springs do not overlap each other.

4. Scissor gear assembly according to claim 1, characterized in that a grenade pin is present in a hole in the main gear to fix the relative position of the gears.

5. Scissor gear assembly according to claim 4, characterized in that the grenade pin has an eccentric protrusion to adjust the relative position of the auxiliary gear to the main gear.

6. Scissor gear assembly according to claim 1, characterized in that the angle over which the interruption in the annular spring extends is less than 90°.

* * * * *